(12) United States Patent
Jarvid et al.

(10) Patent No.: US 12,087,476 B2
(45) Date of Patent: Sep. 10, 2024

(54) LAMINATE WATER BARRIER

(71) Applicant: NEXANS, Courbevoie (FR)

(72) Inventors: Markus Jarvid, Kungalv (SE); Simon Jorgensen, Sellebakk (NO)

(73) Assignee: NEXANS, Courbevoie (FR)

( * ) Notice: Subject to any disclaimer, the term of this patent is extended or adjusted under 35 U.S.C. 154(b) by 183 days.

(21) Appl. No.: 17/555,775

(22) Filed: Dec. 20, 2021

(65) Prior Publication Data

US 2022/0254548 A1 Aug. 11, 2022

(30) Foreign Application Priority Data

Dec. 21, 2020 (EP) ................................. 20 306 648

(51) Int. Cl.
*H01B 7/28* (2006.01)
*B32B 7/12* (2006.01)
(Continued)

(52) U.S. Cl.
CPC ............. *H01B 7/2825* (2013.01); *B32B 7/12* (2013.01); *B32B 15/08* (2013.01); *B32B 27/20* (2013.01); *C08L 23/06* (2013.01); *C08L 67/02* (2013.01); *H01B 7/188* (2013.01); *B32B 2250/03* (2013.01); *B32B 2264/108* (2013.01); *B32B 2307/202* (2013.01);
(Continued)

(58) Field of Classification Search
CPC ... H01B 3/44; H01B 7/08; H01B 7/18; H01B 7/28; H01B 7/2825; H01B 7/285; H01B 7/34; H01B 9/02; H01B 11/02; H01B 11/002; H01B 11/06; H01B 11/10; H01B 11/1025; B32B 7/12; B32B 15/08; B32B 27/20; B32B 2250/03; B32B 2264/108

USPC .... 174/36, 102 R, 102 SC, 103, 104, 105 R, 174/106 SC, 107, 108, 109, 113 R, 115, 174/117 R, 117 A, 119 R; 428/77, 189, 428/192, 201, 209, 295, 343, 344, 346, 428/347, 354, 389, 606; 156/52, 53, 291, 156/308.6, 308.8
See application file for complete search history.

(56) References Cited

U.S. PATENT DOCUMENTS 3,329,547 A * 7/1967 Denenberg .............. B32B 15/08
156/247
3,474,186 A * 10/1969 Hale ...................... H01B 9/023
174/109

(Continued)

OTHER PUBLICATIONS

European Search Report May 28, 2021.

*Primary Examiner* — William H. Mayo, III
(74) *Attorney, Agent, or Firm* — Sofer & Haroun, LLP (57) ABSTRACT

A laminate structure having a metal foil having a lower and an upper surface area, a first layer of a thermoplastic polymer laid onto and covering the lower surface of the layer of metal foil except for a longitudinal uncovered surface area of the layer of metal foil, and a second layer of thermoplastic polymer laid onto and covering the upper surface of the layer of metal foil except for a longitudinal uncovered surface area of the layer of metal foil, and wherein the laminate structure is wrapped around the cable core such that the first uncovered surface area of the metal foil faces the cable core and the second uncovered surface area of the metal foil faces away from the laminate structure, and the laminate structure is thermally joined by a heat treatment.

17 Claims, 9 Drawing Sheets

(51) Int. Cl.
   *B32B 15/08* (2006.01)
   *B32B 27/20* (2006.01)
   *C08L 23/06* (2006.01)
   *C08L 67/02* (2006.01)
   *H01B 7/18* (2006.01)
   *H01B 7/282* (2006.01)

(52) U.S. Cl.
   CPC . *B32B 2307/7265* (2013.01); *B32B 2307/732* (2013.01); *B32B 2457/04* (2013.01); *C08L 2203/206* (2013.01); *C08L 2207/04* (2013.01)

(56) References Cited

U.S. PATENT DOCUMENTS

| | | | | |
|---|---|---|---|---|
| 3,823,747 A * | 7/1974 | Dembiak | H01B 11/1016 | 428/188 |
| 4,323,721 A * | 4/1982 | Kincaid | H01B 11/06 | 428/189 |
| 4,327,246 A * | 4/1982 | Kincaid | H01B 11/1025 | 174/105 R |
| 4,454,379 A * | 6/1984 | Cleveland | H01B 7/2825 | 174/106 SC |
| 4,472,597 A * | 9/1984 | Uematsu | H01B 9/02 | 174/106 SC |
| 4,510,346 A * | 4/1985 | Bursh, Jr. | H01B 11/1016 | 174/115 |
| 4,596,897 A * | 6/1986 | Gruhn | H01B 7/0861 | 428/209 |
| 4,626,619 A * | 12/1986 | Uematsu | H01B 7/2825 | 174/106 SC |
| 4,725,693 A * | 2/1988 | Hirsch | B32B 7/14 | 174/106 SC |
| 5,023,395 A * | 6/1991 | O'Connor | B32B 15/08 | 428/209 |
| 5,053,582 A * | 10/1991 | Terakawa | H01B 11/1025 | 174/109 |
| 6,664,466 B2 * | 12/2003 | Bailey | H01B 11/1008 | 174/105 R |
| 6,717,057 B1 * | 4/2004 | Segall | B32B 27/08 | 174/117 FF |
| 8,026,441 B2 * | 9/2011 | Amato | H01B 11/1813 | 174/102 R |
| 8,916,775 B2 * | 12/2014 | Tamaki | H01B 11/1025 | 174/109 |
| 9,679,688 B2 * | 6/2017 | Akimoto | H01F 1/14775 | |
| 9,697,929 B2 * | 7/2017 | Wehrli | H01B 11/06 | |
| 2008/0217043 A1 * | 9/2008 | Schoke | H02G 3/0412 | 174/110 R |
| 2009/0223694 A1 * | 9/2009 | Nordin | H01B 13/00 | 174/34 |
| 2012/0080213 A1 | 4/2012 | Furuheim et al. | | |
| 2015/0101843 A1 * | 4/2015 | Olsen | H01B 7/045 | 174/109 |

* cited by examiner

iii)

LAMINATE WATER BARRIER

RELATED APPLICATIONS

This application claims the benefit of European Patent Application No. 20 306 648.5, filed on Dec. 21, 2020, the entirety of which is incorporated by reference.

FIELD OF THE INVENTION

The present invention relates to a laminate water barrier suited for dynamical submarine high voltage power cables.

BACKGROUND AND DESCRIPTION OF RELATED ART

The current carrying parts of power cables may need to be kept dry. Intrusion of humidity or water may cause electrical breakdown of the power cable insulation system. The core section of power cables is therefore usually protected by a water barrier arranged circumferentially around the cable core. Up to date, the dominating material in water barriers for power cables is lead since lead has proven to be a reliable and sturdy sheathing material, however with some well-known drawbacks.

One drawback is that lead is a high density material adding significant weight to the cable. The heavy weight induces extra costs in the entire value chain from production, under transport, storage, deployment, and when the cable is discarded after reaching its lifetime. Another drawback is that lead has a relatively low fatigue resistance making leaden water barriers less suited for dynamical power cables. Furthermore, lead is a rather poisonous material increasingly meeting environmental regulation restrictions. An environmentally friendly replacement of lead as water barrier in power cables is desired.

Capacitive charges and resulting currents may cause problems in power cables if they are not conducted out of the cable. It is therefore advantageous to have water barriers being electrically conductive in radial direction.

EP 2 437 272 discloses a power cable comprising water barrier laminate. The main technical feature of a power cable according to the document is that the water barrier laminate comprises a foil made of metal laminated between at least two layers of non-insulating polymer foils constituting a final laminate that is non insulating.

OBJECTS AND SUMMARY OF THE INVENTION

The main objective of the invention is to provide a low weight water barrier suitable for high-voltage power cables, which is capable of conducting capacitive currents radially out of the cable thus avoiding breakdown due to induced voltage gradients.

The present invention is based on the discovery that a lightweight and fatigue resilient water barrier having excellent water insulating effect may be obtained by wrapping a laminate structure comprising a metal foil and a thermoplastic polymer and then heat treat the laminate to thermally set/fuse the layers of wrapped laminate structure. By having bare, non-covered, parts on both sides of the metal foil, the metal foil is able to function as an electrically conducive bridge carrying capacitive charges across the water barrier.

Thus, in a first aspect, the invention relates to a water barrier encapsulating a cable core,
wherein
the water barrier comprises at least one layer of a laminate structure being wrapped around the cable core with at least some overlap between opposite edges of the laminate structure, characterised in that
the laminate structure comprises:
a layer of metal foil having a lower and an upper surface area,
a first layer of thermoplastic polymer laid onto and covering the lower surface of the layer of metal foil except for a first longitudinal uncovered surface area of the layer of metal foil, and
a second layer of thermoplastic polymer laid onto and covering the upper surface of the layer of metal foil except for a second longitudinal uncovered surface area of the layer of metal foil,
and wherein
the laminate structure is wrapped around the cable core such that the first longitudinal uncovered surface area of the metal foil faces the cable core and the second longitudinal uncovered surface area of the metal foil faces away from the laminate structure, and
the laminate structure is thermally joined by a heat treatment.

The feature of the layer of thermoplastic polymer being laid onto and covering the lower surface of the layer of metal foil except for a longitudinal uncovered surface area on the upper surface of the layer of metal foil and a longitudinal uncovered surface area on the lower surface of the layer of metal foil enables the metal foil to obtain electric contact with the surroundings on both the underside and the upper side of the laminate water barrier and thus function as conductive bridge carrying capacitive charges across the laminar water barrier. This conductive bridge effect will become less efficient if the longitudinal area of the upper side of the laminate structure is covered by a (non-conductive) thermoplastic polymer covered area of the next winding/overlapping laminate structure. Thus, the term "the second uncovered surface area of the metal foil faces away from the laminate structure" as used herein means that the second uncovered surface area has a "free" view to either an uncovered surface area of the metal foil of the next winding/overlapping laminate structure to have the metal foils of both layers of laminate structure being in contact and electrically connected, or that the second uncovered surface area is not overlapped/covered by the next layer of laminate structure, i.e. has a free view to the following layers of the power cable laid onto the water barrier.

The term "longitudinal uncovered surface area" as used means that the non-covered surface of the metal foil is extending along the longitudinal length of the laminate structure to enable the non-covered surface area to make contact along the entire length of the laminate structure and from ease of manufacturing. The non-covered surface of the metal foil may in one example embodiment be made by covering the entire metal foil with the thermoplastic polymer layer and then scrape off the polymer in a longitudinal stripe.

Figure 1:
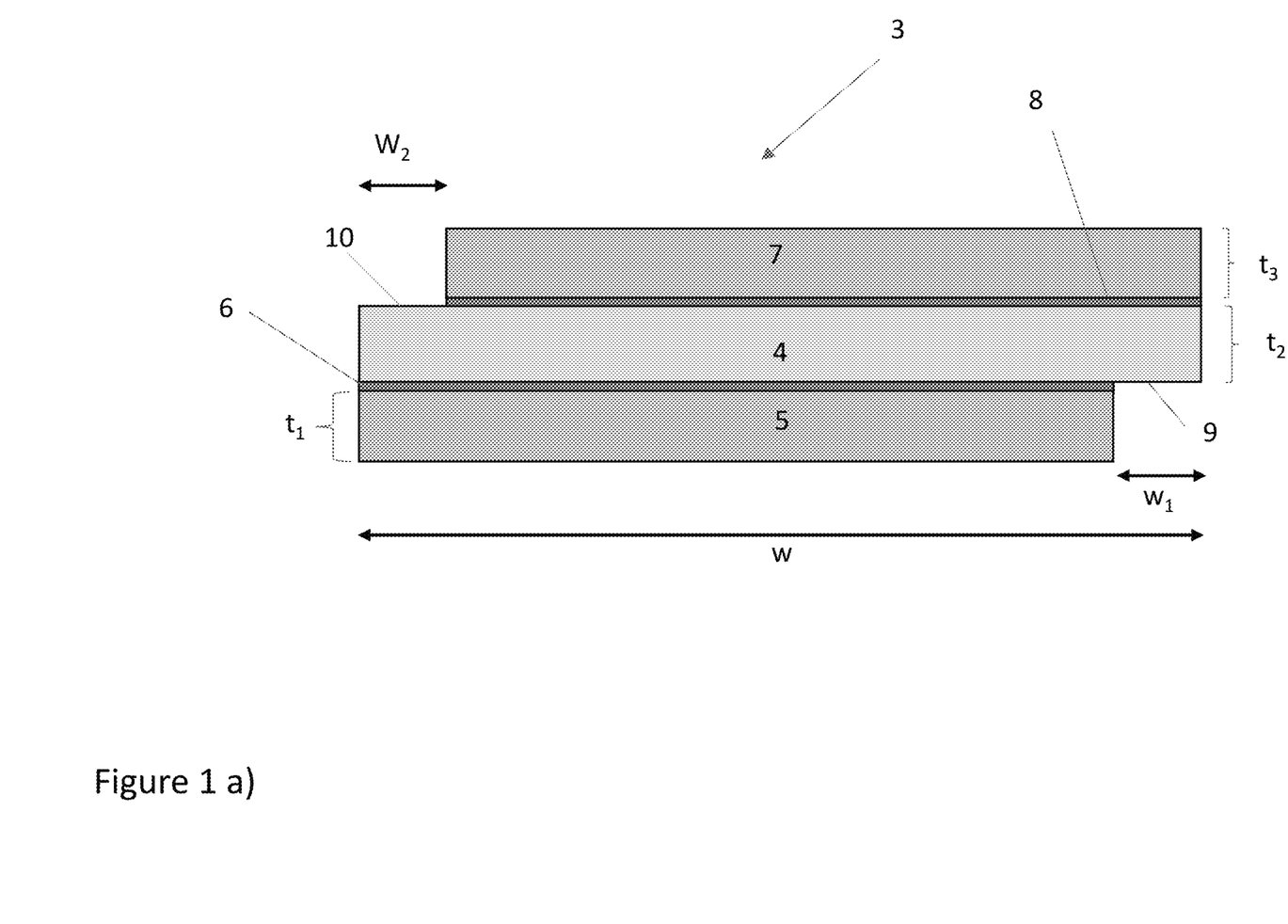
FIG. 1a) is a cut view drawing as seen from the side taken along the stapled line marked as A-A' on FIG. 2, and which schematically illustrates the stratigraphic structure of an example embodiment of the laminate structure according to the invention.
FIG. 1b) is a drawing as seen from above of the example embodiment of the laminate structure shown in FIG. 1b).
FIG. 1c) is drawings of example embodiments of the location and configuration of the longitudinal uncovered surface areas of the laminate structure according to the invention.

In the example embodiment of the water barrier according to the invention where the water barrier is made by helically wrapping the laminate structure around the cable core, the first and the second longitudinal uncovered surface area 9, 10, may advantageously be located at opposite edges of the laminate structure 3 as shown schematically in FIGS. 1a) and 1b). FIG. 1a) is a cross-sectional cut-view drawing as seen from the side illustrating the stratigraphy of an example embodiment of the laminate structure according to the invention. FIG. 1b) is a drawing showing the same example embodiment as shown in FIG. 1a) but seen from below.

The laminate structure according to this example embodiment comprises a layer of metal foil 4 is shaped as a rectangular parallelepiped of thickness $t_2$, width w, and length L having a first layer of thermoplastic polymer 5 on its lower surface of thickness $t_1$, length L and a width $w_1$, where $w_1 < w$, such that the layer of thermoplastic polymer 5 covers all the lower surface area of the layer of metal foil except for a first "stripe" on the underside extending along at edge of the layer of metal foil. Similarly, at its upper side, the layer of metal foil 4 has a has a second layer of thermoplastic polymer 7 of thickness $t_3$ covering all the upper surface of the layer of metal foil except for an area at the left edge of the layer of metal foil causing a second longitudinal "stripe" 10 of uncovered metal foil.

The invention is not tied to using a laminate structure having stripes of uncovered surface area on its sides. The first and second longitudinal uncovered surface area may be located anywhere on the lower and upper surface of the layer of metal foil as long as the location of the "stripes", i.e. the longitudinal uncovered surface area, enables forming the conductive bridge across the water barrier after the laminate structure is wrapped around the cable core. As given above, the longitudinal uncovered surface area of the first layer of the laminate structure being partly or fully overlapped by a second layer of wrapped laminate structure should not be overlapped by a part of the second layer of the laminate structure which is covered with the (non-conductive) thermoplastic polymer layer. Furthermore, the laminate structure may comprise two or more longitudinal uncovered surface regions on its lower and/or upper surface. The width, $w_1$, of the first longitudinal uncovered surface region may preferably be at least 5 mm, more preferably at least 6 mm, more preferably at least 7 mm, more preferably at least 8 mm, more preferably at least 9 mm, and most preferably at least 10 mm. The width, $w_2$, of the second longitudinal uncovered surface region preferably be at least 5 mm, more preferably at least 6 mm, more preferably at least 7 mm, more preferably at least 8 mm, more preferably at least 9 mm, and most preferably at least 10 mm. Likewise, the width of, if present, the additional longitudinal uncovered surface region may preferably be at least 5 mm, more preferably at least 6 mm, more preferably at least 7 mm, more preferably at least 8 mm, more preferably at least 9 mm, and most preferably at least 10 mm.

FIG. 1c) illustrates four example embodiments marked with roman numerals i) to iv) illustrating examples of different locations of the longitudinal uncovered surface regions and example embodiments applying more than one longitudinal uncovered surface region on the lower and/or upper surface of the layer of metal foil. The figure show the lower surface and the upper surface as seen from above. In the example embodiment marked with roman numeral i), the lower surface has a first longitudinal uncovered surface region 9 located along the longitudinal centre axis while the first thermoplastic polymer layer 5 covers the rest of the lower surface of the metal foil layer, and similar for the upper side. A second longitudinal uncovered surface region 10 is located along the longitudinal centre axis while the second thermoplastic polymer layer 7 covers the rest of the upper surface of the metal foil layer. In the example embodiment marked with roman numeral ii), there is two longitudinal uncovered surface regions, located one at each side edge, on both the lower and the upper surface of the layer of metal foil. In the example embodiment marked with roman numeral iii), the lower surface is similar to the lower surface of the ii'th example embodiment while the upper surface is similar to the upper surface of the i'th example embodiment, while in the example embodiment marked with roman numeral iv), the lower surface has two longitudinal uncovered surface regions on both the lower and the upper surface of the layer of metal foil located at approximately ⅓ and ⅔ of the width w.

The laminate structure according to the invention may apply any suitable thickness $t_1$ and/or $t_3$ of the first 5 and second 7 layer of thermoplastic polymer, respectively. In one example embodiment, the thickness $t_1$ and/or $t_3$ may be chosen among one of the following ranges; from 25 to 300 μm, preferably from 35 to 200 μm, more preferably from 40 to 150 μm, more preferably from 50 to 100 μm, and most preferably from 50 to 75 μm.

The term "thermoplastic polymer" as used herein means that the polymer material becomes softer or melts at certain elevated temperatures and thereafter solidifies upon cooling. Thermoplastic materials may be heated and cooled several times without any change in their chemical or mechanical properties. The property of applying a thermoplastic polymer provides the advantage that adjacent layers of thermoplastic polymer of successive overlapping wrappings of the laminate structure may be joined into a single monolithic polymer layer by a heat treatment making the thermoplastic polymer softer and/or melting to make them merge and then solidify as a single polymer layer. This feature effectively seals and make the interface between adjacent polymer layers practically impervious to water intrusion.

An advantage of the laminate structure according to the invention is that the electric conductivity across the laminate water barrier is obtained by the layer of metal foil. There is no need for the polymer layers to conduct electricity. This allows using non-conductive thermoplastic polymers giving larger freedom in choice of polymer type to be applied in the layer of thermoplastic polymer s. Thus, the invention may apply any thermoplastic polymer known to the skilled person being suited for use in power cables. Examples of suited polymers includes, but is not limited, to; a polyethylene-based material constituted of either low density polyethylene (LDPE), a linear low density polyethylene (LLDPE), a medium density polyethylene (MDPE), or a high density polyethylene (HDPE), or a copolymer of ethylene with one or more polar monomers of; acrylic acid, methacrylic acid, glycidyl methacrylate, maleic acid, or maleic anhydride. In one example embodiment, the thermoplastic polymer may be made conducting by addition and homogenisation of until 40 weight % particulate carbon in the polymer mass. Examples of suited particulate carbon includes but is not limited to; comminuted petrol coke, comminuted anthracite, comminuted char coal, carbon black, carbon nanotubes, etc.

In one example embodiment, the thermoplastic polymer layer 5, 7, may further comprise a second polymer layer of e.g. polyester or polyethylene terephthalate, PET.

The term "layer of metal foil" as used herein, refers to the metal layer in the middle of the laminate structure. The invention is not tied to use of any specific metal/metal alloy or thickness of the metal foil. Any metal/metal alloy at any thickness known to be suited for use in water barriers in power cables by the skilled person may be applied. In one example embodiment, the metal foil is either an Al/Al-alloy such as for example an AA1xxx series, an AA5xxx series or an AA6xxx series alloy according to the Aluminium Association Standard, or a Cu/Cu-alloy such as for example pure Cu, a CuNi-alloy or a CuNiSi-alloy, or a Fe/Fe-alloy, such for example stainless alloy SS316 or S32750. The thickness of the metal foil (shown as curly bracket $t_2$ in FIG. 1b)) may in an example embodiment be in one of the following ranges; from 10 to 250 µm, preferably from 15 to 200 µm, more preferably from 20 to 150 µm, more preferably from 25 to 100 µm, and more preferably from 30 to 75 µm, and most preferably from 15 to 20 µm.

In one example embodiment, the adherence between the layer of metal foil and the layer of thermoplastic polymer may be enhanced by applying an adhesive interposed between the layer of metal foil and the layer of thermoplastic polymer. The adhesive should only be laid between the thermoplastic polymer and the metal foil, i.e. not cover the uncovered surface areas on the upper and lower surface of the layer of metal foil. In the example embodiment shown in FIG. 1a), the first layer of thermoplastic polymer 5 is adhered to the layer of metal foil 4 by a first adhesive layer 6 and the second layer of thermoplastic polymer 7 is adhered by a second adhesive layer 8.

The invention may apply any adhesive known to the skilled person being suited for attaching a polymer layer to a metal surface. Examples of suited adhesives includes, but is not limited to; epoxy resins, phenolic resins, polyurethane based glues, cyanoacrylates, acrylic glues, polyester based glues, copolymer of ethylene and ethyl acrylate, copolymer of ethylene and ethyl acrylic acid, methacrylic acid, copolymer of ethylene and glycidyl methacrylate or epoxy-based monomer such as 1,2-epoxy-1-butene, and copolymer of ethylene and maleic-anhydride. The above mentioned adhesives may be applied with or without electrically conductive particulates providing the glue an enhanced electric conductivity.

The term "wrapped around the cable core with at least some overlap between opposite edges" as used herein refers to the need for having the laminate structure covering 100% of the surface of the cable core and forming a watertight enclosure of the cable core. This is obtained by having the wrapped laminate structure laid around the cable core such that is partly laid over itself forming an overlap where the upper layer of thermoplastic polymer of one winding of laminate structure comes in contact with the lower layer of thermoplastic polymer of the next winding of laminate structure.

Figure 2:
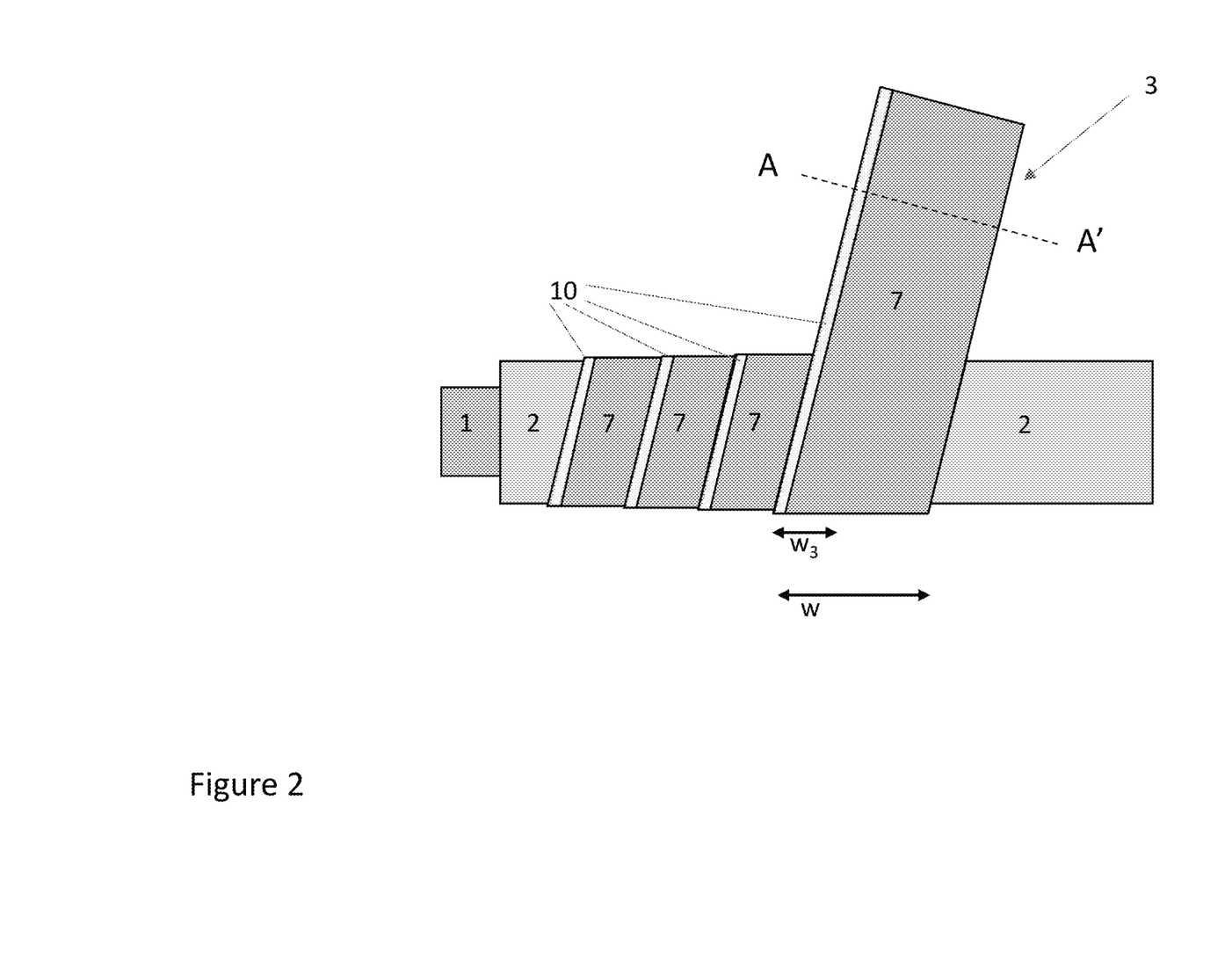
FIG. 2) is a drawing schematically illustrating as seen from the side of a cable core being covered with the example embodiment of a laminate structure shown in FIGS. 1a) and 1b).

This principle is illustrated in FIG. 2, which is a drawing schematically illustrating as seen from the side an example embodiment of a cable core 1 of a single conductor 1 cable in the process of being covered by a laminate tape/structure 3, similar to the example embodiment shown in FIGS. 1a) and 1b), being wrapped helically around the cable core. As seen on the figure the laminate structure/tape has a width, indicated by double arrow marked with "w". The laminate structure 3 is wrapped around the cable core such that its first uncovered surface area (9) which lies along the right side edge on the underside (and thus not shown on the figure) of each winding of the laminate structure/tape is facing (and in contact with) the cable core, while the second uncovered surface area (10) which lies along the left side edge on the upper side (and thus shown on the figure) of each winding is not covered by the next winding but is facing away from the water barrier and will come in contact with the next sheathing/layer laid onto the water barrier. In this manner, capacitive charges from the inside of the water barrier enabled to pass across the water barrier through the layer of metal foil and further into the outer layers of the power cable surrounding the cable core. Each successive winding is made to overlap the previous with a width $w_3$.

An advantage of applying the laminate structure in the form of a tape being helically wrapped around the cable core, apart from the laminate structure being easy and cheap to produce, is that the tape form enables wrapping the laminate around the cable core with a tension to ensure a tight enclosure around the cable core and good contact between deposited laminate layers.

The term "the laminate structure is thermally joined by a heat treatment" as used herein means that after wrapping the laminate structure around the cable core, the laminate structure is heat treated to a temperature at which the thermoplastic polymer becomes soft or melts such that polymer layers in the wrapped laminate structure made to contact each other merge and then solidify as a single polymer layer. If a polyethylene based polymer is applied, the temperature treatment needs typically to increase the temperature of the laminate structure to 120° C.-130° C. to melt the thermoplastic polymer. In one example embodiment, the heat treatment for thermally joining the laminate structure may be obtained by forming an outer sheathing laid onto the water barrier layer/laminate layer(s) by extrusion of a polymer at an extrusion temperature of around 200° C. The heat from the molten polymer exiting the extruder fuses the polymer layers of the laminate structure below so that the adjacent polymer layers of overlapping laminate structure edges are fused together and seals the water barrier. In other example embodiments, the heat treatment for thermally joining the laminate structure may be obtained by application of hot air, radiation (e.g. laser, IR) or induction.

Examples of suited polymers to be applied in the outer sheathing includes, but is not limited to; polyolefine based materials such as e.g. HDPE, LDPE, LLDPE, MDPE, polyvinyl chloride (PVC), polypropylene (PP), or thermoplastic polyurethane (TPU), etc. The polymer material of the outer sheathing layer may be either electrically insulating (pure polymer) or be made electrically conductive by addition and homogenisation of from 20 to 40 weight % particulate carbon in the polymer mass. Examples of suited particulate carbon includes but is not limited to; comminuted petrol coke, comminuted anthracite, comminuted char coal, carbon black, carbon nanotubes, etc. The deposited outer sheathing may be cooled in a water bath directly after deposition.

Figure 3:
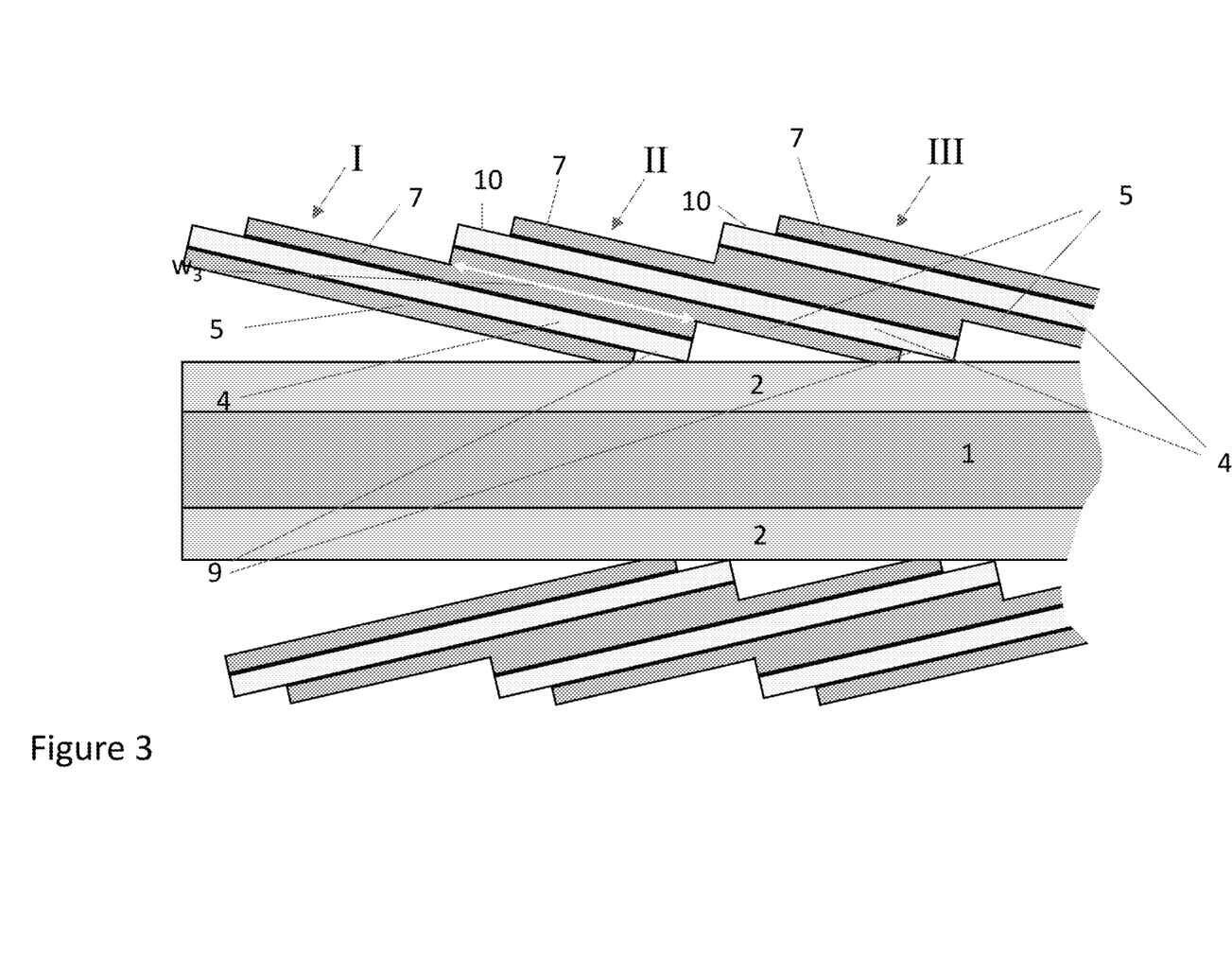
FIG. 3 is a vertical cut view drawing as seen from the side of a section of an example embodiment of the water barrier according to the invention comprising three windings of the laminate tape.

The combined effect of the feature of wrapping the laminate structure with some overlap between opposite edges and the heat treatment is to seal the water barrier against potential longitudinal intrusion/migration of water by fusing together the polymer layers of the opposite edges overlapping each other. The seal resulting from the fusion of overlapping polymer layers is illustrated schematically in FIG. 3. The figure is a vertical cut view drawing as seen from the side of a section of an example embodiment where a cable core with conductor 1 and insulator 2 is having a helically wrapped laminate water barrier structure applying the example embodiment shown in FIGS. 1a) and 1b). The figure shows a section of almost three windings of a helically wrapped laminate tape as shown in e.g. FIG. 2. Each winding is identified on the figure by stapled boxes marked with Roman numerals I to III, respectively. As seen on FIG. 3, winding I is followed by winding II which partially overlaps winding I by a width $w_3$, and winding III overlaps winding II by a width $w_3$. The overlapping length $w_3$ is marked by the white double arrow on FIG. 3. The thermosetting causes the second thermoplastic polymer layer 7 of winding I to merge with an become one with the first thermoplastic polymer layer 5 of winding II in the overlapping area, and similarly for the second and first thermoplastic polymer layer of winding II and III. This forces water/ moisture to diffuse through a continuous solid polymer phase to enter the inside of the laminar water barrier since the metal foil is impenetrable for moisture/water. The wider overlap between opposite edges of the wrapped laminate structure/tape, the longer becomes the diffusion length, $w_3$, which must be passed to arrive at the cable core.

In general, the longer diffusion path, length $w_3$, the more watertight the laminar water barrier according to the invention becomes. In one example embodiment, the overlap between successive layers of the laminate structure may advantageously provide a shortest diffusion path, $w_3$, of at least 10 mm, more preferably at least 15 mm, more preferably at least 20 mm, more preferably at least 25 mm, more preferably at least 30 mm, more preferably at least 35 mm, and most preferably at least 40 mm.

In one example embodiment, the laminate structure according to the invention may be longitudinally wrapped around the cable core with an overlap between its left and right side edges to form a longitudinal seal between the overlapping edges. An example of the process for manufacturing such an embodiment applying a laminate structure with a longitudinal uncovered surface area at both longitudinal side edges, one at the lower and one at the upper surface, is illustrated schematically in FIGS. 4a) and 4b). The figures are cross-sectional cut view drawings. As seen on FIG. 4a), the cable core 2 is in the process of being encapsulated by a laminate structure 3 according to the invention which is longitudinally wrapped around the cable core from the bottom to form the overlap at the top. In this example embodiment, there is a swelling tape 11 laid onto the insulation 2 of the conductor 1. FIG. 4b) is a close up of the overlapping edges which are to be pressed down towards the underlying swelling tape 11. As seen on the figure, the first uncovered surface 9 is facing down and will make contact with the underlying swelling tape while the second uncovered surface 10 is facing away from the laminate water barrier.

In one example embodiment, there may be applied two layers of the laminate structures according to the invention being longitudinally wrapped. The first longitudinally wrapped laminate structure may e.g. be similar to the embodiment shown in FIGS. 4a) and 4b). This embodiment is wrapped around the cable core from the bottom and is to be sealed at the top of the cable core by an overlap joining the opposite side edges of the laminate structure as shown in FIG. 4b). By applying a second laminate structure on top of the first laminate structure being wrapped around form the top and joined and sealed at the bottom, the entire second thermoplastic polymer layer of the first "bottom-up" laminate structure to be fused and integrated with the entire first thermoplastic polymer layer of the second "top-down" laminate structure causing a diffusion length for penetrating water of at least half the circumference of the cable core. In this case, the second laminate structure being wrapped around the first laminate structure should have an longitudinal uncovered surface at its longitudinal centre axis of the second laminate structure to enable electric contact between the metal foil of the first laminate structure and the metal foil of the second laminate structure as shown schematically in FIG. 4c).

Figure 4:
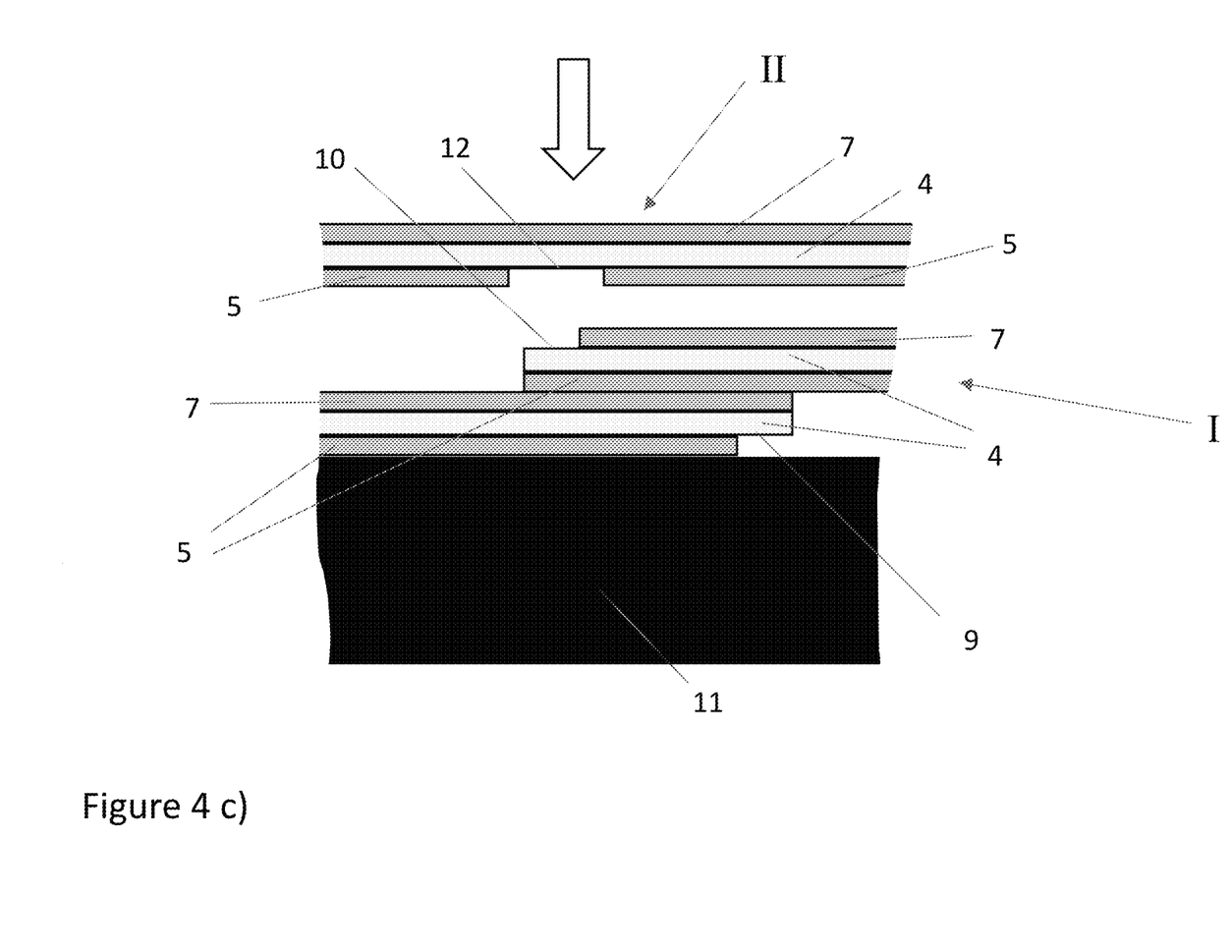
Figure 4A:
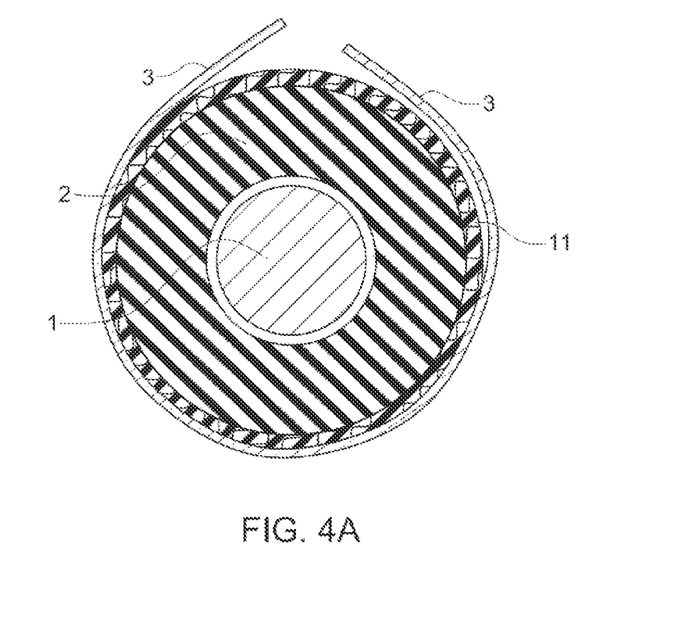
FIGS. 4a) and 4b) are cross-sectional cut view drawings of an example embodiment of the laminate structure according being longitudinally wrapped around a cable core.
Figure 4B:
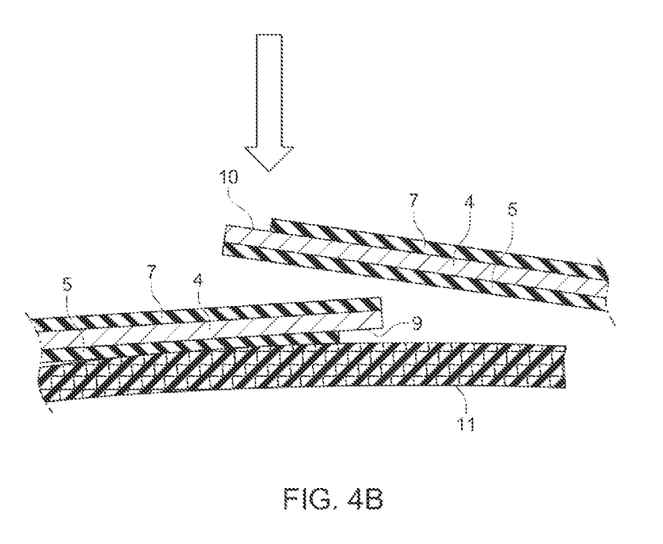

FIG. 4c) illustrates an excerpt of a vertical cut-view of the top area of the cable core after the first laminate structure, indicated by the arrow marked with roman number I on the figure, has been laid onto the swellable tape 11 around the cable core (not shown), and the second laminate structure, marked with roman number II on the figure, is in the process of being laid down onto the first laminate structure, wrapped around and joined at the bottom. As seen on the figure, the longitudinal uncovered surface 12 of the second laminate structure is aligned such that it will obtain electric contact with the longitudinal uncovered surface 10 of the first laminate structure. This configuration forms an excellent water barrier when being thermally joined because water barrier comprises a first polymer layer of the first laminate structure, a first metal foil of the first laminate structure, a second polymer layer of the first laminate structure being fused and integrated with the first polymer layer of the second laminate structure, a second metal foil of the second laminate structure, and finally a second polymer layer of the second laminate structure. Thus, since the metal foils are impenetrable for moisture/water, any moisture/water entering the cable core must migrate from the seam of the second laminate structure into and migrate through the fused polymer layers between the second and the first metal foil to the seam of the first laminate structure. This diffusion distance is at least equal to a half circumference of the cable core. The invention is not tied to this example embodiment, any configuration of the location and number of the longitudinal uncovered surface areas in the first and the second laminate structure which enables electric contact with the underside of the laminate water barrier, between the first and second laminate structure and the ambient environment on the outside of the water barrier may be applied.

In a second aspect, the invention relates to a power cable, comprising:
   at least one cable core, where each cable core comprises:
      an electric conductor, and
      an electric insulation system electrically insulating the electric conductor, and
      a water barrier arranged around the electric insulation system,
characterised in that
   the water barrier is a water barrier according to the first aspect of the invention,
and in that
   the power cable further comprises a mechanical protection system laid around the at least one cable cores as a group.

The term "current conductor" as used herein encompasses any electric current carrying part of power cables known to the skilled person. The electric conductor is typically made of a metal, often an Al/Al-alloy or a Cu/Cu-alloy but may be of any material known suitable as current conductors. The current conductor may be a single strand of the electrically conductive material or a plurality of strands arranged in a bundle. In the case of applying a current conductor comprising a bundle of strands, the space in-between the strands of the bundle may be occupied by an insulating or a conducting filler compound.

The term "electric insulation system" as used herein refers to the electric insulation around the current conductor. The invention is not tied to any specific electric insulation system but may apply any electric insulation system known to the skilled person being suited for electrically insulating current conductors. In one example embodiment, the electric insulation system comprises an insulating layer such as e.g. a polyethylene layer and an electric shielding such as e.g. a conducting layer arranged around the current conductor. If the power cable comprises two or more current conductors, each of them will have its own electric insulation system.

The term "cable core" as used herein refers to a single current conductor comprising its electric insulation system. In case the power cable comprises two or more current conductors and thus two or more cable cores, the laminate structure according to the invention is to be laid separately around each of the cable cores. In one example embodiment, each of the cable cores applied in the power cable may further comprise an outer polymer sheathing laid onto its water barrier. The outer polymer sheathing may e.g. be made of a polyethylene, such as a low density polyethylene (LDPE), a linear low density polyethylene (LLDPE), a medium density polyethylene (MDPE), or a high density polyethylene (HDPE). The outer sheathing may be insulating or made conductive by containing/having incorporated from 20 to 40 weight % carbon black in the polyethylene phase.

The term "power cable" as used herein encompasses any known power cable having one or a plurality of the above defined cable cores. In one example embodiment, the power cable is an intermediate to high current carrying power cable intended for outdoor and/or subsea use. The power cable may in an example embodiment further comprise optical fibres, umbilical tubes, distancing profiles arranging the cable cores conductors in a cross-section, and any other component known to be present in a power cable.

The term "mechanical protection system" as used herein refers to outer layers of the power cable intended to mechanically protect the cable core(s) and other possibly present components of the power cable from potentially detrimental mechanical strains imposed on the cable under handling, use and storage. The mechanical protection system may comprise any layer/part known to the skilled person suited for mechanically reinforcing and/or protecting the power cable. In one example embodiment, the mechanical protection system comprises an armouring made of e.g. steel cords. The term "laid around the at least one cable cores as a group" as used herein means thus that the mechanical protection system is, contrary to the water barrier not to be separately laid around each cable core, but is to be laid as a layer surrounding the group of one or more cable cores applied in the power cable.

In a further example embodiment, the mechanical protection system may comprise an oversheath, an outermost polymer layer defining the interface towards the surrounding environment of the power cable. The invention may apply any oversheath known to the skilled person suited for being used as the outer mantle of power cables, such as e.g. a polyethylene polymer such as e.g. chlorosulphanated polyethylene (CSP), polypropylene yarn with bitumen, HDPE, LLDPE etc.

The cable core with its water barrier and the mechanical protection system are the typical minimum of components required to make a functional power cable with comparable high electric power transferring capacity.

BRIEF DESCRIPTION OF FIGURES

FIG. 4c) is a drawing illustrating an excerpt of the formation of an example embodiment of the water barrier according to the invention applying two longitudinally wrapped laminate structures.

DETAILED DESCRIPTION

The water blocking effect of the water barrier according to the invention is verified by simulation of water intrusion through the water barrier. The simulation applied an embodiment of laminate structure comprising an adhesive layer between the metal foil and the first and second thermoplastic polymer layers. The simulation is based on determination of the diffusion of water through the thermoplastic polymer layer and the adhesive layer of the laminate structure. The metal foil was assumed impenetrable for water.

Figure 5:
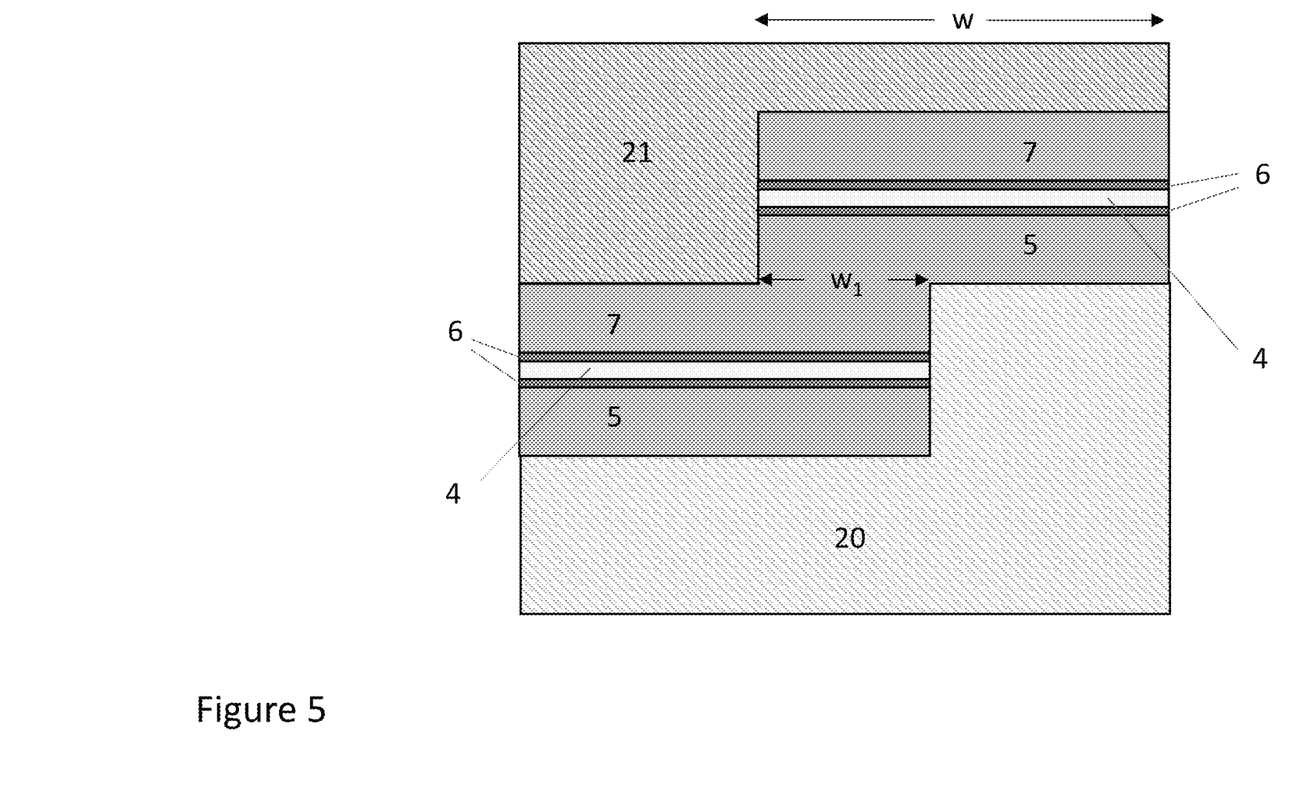
FIG. 5 is cut view drawings as seen from the side of an example embodiment of the water barrier according to the invention applied to simulate the water blocking capacity.

The calculations were made on an example embodiment shown in FIG. 5. The water barrier was assumed to consist of two partly overlapping layers of the laminate structure according to the invention laid onto an insulation layer 20 of cross-linked polyethylene (XLPE). The laminate structure consisted of a first 5 and a second 7 layer assumed to be cross-linked polyethylene (XLPE). Both layers are 50 μm thick. The first and second adhesive layers (6) were assumed to be continuous layers of cross-linked polyethylene (XLPE) of 2.5 μm thickness. The metal foil 4 was assumed to be 18 μm thick. The lower edge of domain 20 below the water barrier was assumed to always be completely dry, i.e. a relative humidity of 0%. In the simulation, domain 20 was assumed to be XLPE. Above the water barrier, there was assumed an outer sheathing 21 of high density polyethylene where the top edge is always saturated with water, i.e. constantly having a relative humidity of 100%. Furthermore, the diffusion over the boundaries on the left and right sides of FIG. 5 is always set to zero.

The simulations are based on Fick's law of diffusion and Henry's law to determine the saturation and diffusion of moisture through the outer sheathing 21, adhesive layers 6 and the thermoplastic polymer layer 5, 7, and the inner domain 20. The simulation method and the diffusion and solubility parameters applied in the calculations are taken from reference [1].

The diffusion coefficient D was calculated using the Arrhenius parameters $D_0$ and $E_D$. $D_0$ and $E_D$ was $3.30 \cdot 10^4$ m$^2$/s respectively 55.7 kJ/mol for the adhesive layers 6 and the polymeric parts of the laminate structure 5,7 as well as the inner domain 20. The corresponding parameters for the outer sheathing 21 were $1.40 \cdot 10^2$ m$^2$/s and 81.37 kJ/mol.

The solubility coefficient S was calculated using the Arrhenius parameters $S_0$ and $E_S$. $S_0$ and $E_S$ was $1.80 \cdot 10^{-7}$ kg/(m$^3$ Pa) respectively 9.90 kJ/mol for the adhesive layers 6 and the polymeric parts of the laminate structure 5,7 as well as the inner domain 20. The corresponding parameters for the outer sheathing 21 were 7.21·10$^{-11}$ kg/(m$^3$ Pa) and −35.92 kJ/mol.

The temperature was assumed to be 40° C.

With these assumptions and parameters, the calculations gave that the time needed for 1 gram of moisture entering into the low-density polyethylene insulation layer 20 of the cable core was 320 years with an overlap (length w$_1$) of 10 mm, 768 years with an overlap of 25 mm, and 1216 years with an overlap of 40 mm.

REFERENCE

1. S. M. Hellesø, S. Hvidsten, G. Balog, and K. M. Furuheim (2011), "Calculation of water ingress in a HV subsea XLPE cable with a layered water barrier sheath system", *Journal of Applied Polymer Science* 121(4):2127-2133 DOI: 10.1002/app.33568

The invention claimed is:

1. A water barrier encapsulating a cable core, wherein the water barrier comprises:
   at least one layer of a laminate structure being wrapped around the cable core with at least some overlap between opposite edges of the laminate structure, wherein the laminate structure comprises:
      a layer of metal foil having a lower and an upper surface area,
      a first layer of thermoplastic polymer laid onto and covering the lower surface of the layer of metal foil except for a first longitudinal uncovered surface area of the layer of metal foil, and
      a second layer of thermoplastic polymer laid onto and covering the upper surface of the layer of metal foil except for a second longitudinal uncovered surface area of the layer of metal foil, and wherein
   the laminate structure is wrapped around the cable core such that the first longitudinal uncovered surface area of the metal foil faces the cable core and the second longitudinal uncovered surface area of the metal foil faces away from the laminate structure, and
   the laminate structure is thermally joined by a heat treatment.

2. The water barrier according to claim 1, wherein the metal foil is either:
   aluminium,
   an aluminium alloy of the AA1xxx series, AA5xxx series or the AA6xxx series according to the Aluminium Association Standard,
   copper
   a copper-alloy
   a CuNi-alloy
   a CuNiSi-alloy,
   iron
   a Fe-alloy
   stainless steel alloy SS316
   or
   stainless steel alloy S32750.

3. The water barrier according to claim 1, wherein the thickness of the metal foil is in the ranges of 10 to 250 μm, preferably from 15 to 200 μm, more preferably from 20 to 150 μm, more preferably from 25 to 100 μm, more preferably from 30 to 75 μm, and most preferably from 15 to 20 μm.

4. The water barrier according to claim 3, wherein the thickness of the metal foil is in the range from 15 to 20 μm.

5. The water barrier according to claim 1, wherein the laminate structure further comprises a first adhesive layer laid in between the metal foil and the first thermoplastic polymer layer and a second adhesive layer in between the metal foil and the second thermoplastic polymer layer, wherein the first and second adhesive layers do not coat the first and second longitudinal uncovered surface areas, respectively.

6. The water barrier according to claim 5, wherein the adhesive layers are chosen from one of: epoxy resins, phenolic resins, polyurethane based glues, cyanoacrylates, acrylic glues, polyester based glues, copolymer of ethylene and ethyl acrylate, copolymer of ethylene and ethyl acrylic acid, methacrylic acid, copolymer of ethylene and glycidyl methacrylate or epoxy-based monomer such as 1,2-epoxy-1-butene, and copolymer of ethylene and maleic-anhydride.

7. The water barrier according to claim 5, wherein the adhesive contains electrically conductive particles.

8. The water barrier according to claim 1, wherein the first and the second layer of a thermoplastic polymer is chosen from one of: a low density polyethylene (LDPE), a linear low density polyethylene (LLDPE), a medium density polyethylene (MDPE), or a high density polyethylene (HDPE), or a copolymer of ethylene with one or more polar monomers of; acrylic acid, methacrylic acid, glycidyl methacrylate, maleic acid, or maleic anhydride.

9. The water barrier according to claim 8, wherein the first and the second layer of thermoplastic polymer contains from 20 to 40 weight % particulate carbon in the polymer mass chosen from one of; comminuted petrol coke, comminuted anthracite, comminuted char coal, carbon black, or carbon nanotubes.

10. The water barrier according to claim 1, wherein one or both of the thermoplastic polymer layers further comprises a second polymer layer of polyethylene terephthalate, PET, or a polyester.

11. The water barrier according to claim 1, wherein the overlap between successive layers of the laminate structure provides a shortest diffusion path, w$_3$, of at least 10 mm.

12. The water barrier according to claim 11, wherein the overlap between successive layers of the laminate structure provides a shortest diffusion path, w$_3$, of at least 40 mm.

13. The water barrier according to claim 1, wherein
   the laminate structure is shaped as a rectangular parallelepiped of thickness t$_2$, width w, and length L, and
   the first longitudinal uncovered surface area is located along a first side edge of the lower surface of the layer of metal foil, and the second longitudinal uncovered surface area is located along a second side edge opposite the first edge and at the upper surface of the layer of metal foil,
   and wherein
   the laminate structure is wrapped helically or longitudinally around the cable core.

14. A power cable, comprising:
   at least one cable core, where each cable core comprises:
      an electric conductor, and
      an electric insulation system electrically insulating the electric conductor, and
      a water barrier arranged around the electric insulation system,
   wherein
   the water barrier is a water barrier according to claim 1, and in that
   the power cable further comprises a mechanical protection system laid around the at least one cable cores as a group.

15. The power cable according to claim 14, wherein the power cable further comprises an outer sheathing laid onto the water barrier layer by extrusion of a polymer at an extrusion temperature of around 200° C.

16. The power cable according to claim 15, wherein the outer sheathing is one of; a polyolefine based material, HDPE, LDPE, LLDPE, MDPE, polyvinyl chloride (PVC), polypropylene (PP), or thermoplastic polyurethane (TPU).

17. The power cable according to claim 16, wherein the polymer material of the outer sheathing contains until 40 weight % particulate carbon in the polymer mass, and where the particulate carbon is one of; comminuted petrol coke, comminuted anthracite, comminuted char coal, carbon black, or carbon nanotubes.

* * * * *